(12) United States Patent
Park et al.

(10) Patent No.: US 11,440,005 B2
(45) Date of Patent: Sep. 13, 2022

(54) DEVICE COMPRISING MICROBEADS CAPABLE OF ADJUSTING PH OF SAMPLE

(71) Applicant: LG CHEM, LTD., Seoul (KR)

(72) Inventors: Byung Hyun Park, Daejeon (KR); Byoung Hyoun Kim, Daejeon (KR); Su Youn Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 211 days.

(21) Appl. No.: 16/767,997

(22) PCT Filed: Aug. 30, 2019

(86) PCT No.: PCT/KR2019/011106
§ 371 (c)(1),
(2) Date: May 28, 2020

(87) PCT Pub. No.: WO2020/046027
PCT Pub. Date: Mar. 5, 2020

(65) Prior Publication Data
US 2020/0360927 A1 Nov. 19, 2020

(30) Foreign Application Priority Data

Aug. 30, 2018 (KR) .......................... 10-2018-0102652
Aug. 30, 2018 (KR) .......................... 10-2018-0102653

(51) Int. Cl.
*B01L 3/00* (2006.01)
(52) U.S. Cl.
CPC ..... *B01L 3/502715* (2013.01); *B01L 3/50273* (2013.01); *B01L 2200/027* (2013.01); *B01L 2200/0647* (2013.01); *B01L 2200/16* (2013.01)

(58) Field of Classification Search
CPC .. B01L 3/502715; B01L 3/5027; B01L 3/502; B01L 3/50; B01L 3/50273; B01L 2200/027; B01L 2200/067; B01L 2200/16
USPC ..................... 422/502, 500; 436/55
See application file for complete search history.

(56) References Cited

U.S. PATENT DOCUMENTS

| | | | |
|---|---|---|---|
| 7,914,660 B2 | 3/2011 | Lee et al. | |
| 8,040,997 B2 | 10/2011 | Sano et al. | |
| 8,114,261 B2 | 2/2012 | Lee et al. | |
| 8,764,956 B2 | 7/2014 | Lee et al. | |
| 9,952,606 B2 | 4/2018 | Kuroda et al. | |
| 2005/0070010 A1* | 3/2005 | Laurell | B01L 3/0268 435/287.2 |
| 2005/0284213 A1* | 12/2005 | Karp | G01N 30/6095 73/61.52 |
| 2008/0171393 A1 | 7/2008 | Lu et al. | |

(Continued)

FOREIGN PATENT DOCUMENTS

| | | |
|---|---|---|
| CA | 2694900 C | 7/2009 |
| CN | 103837530 A | 6/2014 |

(Continued)

*Primary Examiner* — Christine T Mui
(74) *Attorney, Agent, or Firm* — Dentons US LLP (57) ABSTRACT

The present disclosure relates to a device capable of adjusting the pH of a sample and provides a device comprising microbeads capable of adjusting the pH of a sample to a predetermined value. The device comprises microbeads enabling adjustment to different pH values in each of a plurality of channels, and enables adjustment of the pH of the sample to a plurality of different pH values simultaneously upon injection of the sample.

12 Claims, 4 Drawing Sheets (56) References Cited

U.S. PATENT DOCUMENTS

| | | |
|---|---|---|
| 2011/0210000 A1 | 9/2011 | Kozulie |
| 2014/0273014 A1 | 9/2014 | Di Tullio et al. |
| 2014/0367338 A1 | 12/2014 | Gu et al. |
| 2015/0126426 A1 | 5/2015 | Kumar et al. |
| 2015/0238963 A1* | 8/2015 | Han ................. B03B 5/62 210/801 |
| 2015/0260701 A1 | 9/2015 | Zhang et al. |
| 2016/0018404 A1 | 1/2016 | Iyer et al. |
| 2017/0174854 A1 | 6/2017 | Clark et al. |

FOREIGN PATENT DOCUMENTS

| | | |
|---|---|---|
| CN | 104968403 A | 10/2015 |
| CN | 204748866 U | 11/2015 |
| CN | 105122065 A | 12/2015 |
| CN | 105722768 A | 6/2016 |
| CN | 205734519 U | 11/2016 |
| CN | 106337187 A | 1/2017 |
| CN | 206052002 U | 3/2017 |
| CN | 107831097 A | 3/2018 |
| EP | 1672459 A2 | 6/2006 |
| EP | 2224452 B1 | 1/2014 |
| EP | 3040801 B1 | 10/2018 |
| JP | 2515002 B2 | 4/1996 |
| JP | 2006-171005 A | 6/2006 |
| JP | 2009-156795 A | 7/2009 |
| JP | 2017-122600 A | 7/2017 |
| KR | 10-0657965 B1 | 12/2006 |
| KR | 10-2010-033531 A | 3/2010 |
| KR | 10-1004749 B1 | 1/2011 |
| KR | 10-2013-0135112 A | 12/2013 |
| KR | 10-2015-0053873 A | 5/2015 |
| KR | 10-2016-0048897 A | 5/2016 |
| KR | 10-2016-0133837 A | 11/2016 |

\* cited by examiner

DEVICE COMPRISING MICROBEADS CAPABLE OF ADJUSTING PH OF SAMPLE

BACKGROUND OF THE INVENTION

1. Field of the Invention

This application claims the benefit of priorities to Korean Patent Application Nos. 10-2018-0102652, filed on Aug. 30, 2018 and 10-2018-0102653, filed on Aug. 30, 2018, the entire disclosures of which are incorporated herein by reference.

The present invention relates to a device capable of adjusting pH of a sample, and more particularly, to a device containing microbeads capable of adjusting the pH of a sample to a desired pH, and also to a device containing microbeads capable of adjusting pH in each of a plurality of channels to simultaneously adjust the pH of a sample to a plurality of different pH with a single sample injection.

2. Description of the Related Art

In general, in order to adjust the pH, it is performed that an acid or base solution is added to a sample, pH value of the sample is measured by a pH meter or a pH paper sensor, and optimization is carried out to reach a desired pH value.

In the conventional automatic pH control device, the process of continuously adding an acid or a base and observing pH of a sample in real time with an electrochemical device is automated using a valve device, which requires a lot of cost and time. Therefore, it is uneconomical.

SUMMARY OF THE INVENTION

For the conventional pH control, a series of processes of measuring pH value obtained by adding an acid or base solution to a sample by a pH meter or a pH paper sensor and optimizing until a desired pH value is obtained has the disadvantages of being labor intensive, time-consuming and expensive. Therefore, in order to solve the problems in the series of optimization process for the conventional pH control, the present invention is to provide an automated device capable of adjusting pH of a sample to a plurality of pH more simply and quickly.

The device containing microbeads for adjusting pH of a sample according to one embodiment of the present invention may comprise:

a channel filled with microbeads capable of adjusting pH of the sample;

an inlet for injecting the sample into the channel; and an outlet for discharging the sample having its pH adjusted in the channel, wherein the pH of the injected sample is adjusted to the pH of the microbeads in the channel.

Effect of the Invention

According to the present invention, it is possible to adjust pH of a sample to a desired pH more simply and quickly by providing microbeads for adjusting pH in the channel. In addition, when provided with a plurality of channels, each of which having microbeads capable of adjusting pH to the plurality of pH values, there is an advantage of simultaneously adjusting pH to multiple desired pH values from a single sample injection.

In addition, the disk-type device comprising microbeads capable of adjusting the pH of the sample of the present invention is manufactured in the shape of rotating disk and enables the sample to pass through the beads-filled channels having different pH by control of the rotational force on the rotating disk. These features can be integrated into sensing analysis systems through disk-based chemical reactions to improve detection sensitivity.

DETAILED DESCRIPTION OF THE INVENTION

The device containing microbeads capable of adjusting pH of a sample according to the present invention may comprise a channel filled with microbeads for adjusting pH of the sample; an inlet for injecting the sample into the channel; and an outlet for discharging the sample having its pH adjusted in the channel, wherein the pH of the injected sample is adjusted to have the pH of the microbeads in the channel.

In the device containing microbeads for adjusting pH of a sample according to the present invention, the surface of the microbeads may be coated with a salt so that the pH of the injected sample can be adjusted to a desired pH in the channel.

The device containing microbeads for adjusting pH of a sample according to the present invention may further comprise a main injection part for receiving the sample and injecting the sample into the inlet, the channel may be provided in plurality, the microbeads filled in each of the channels may be coated to have different pH, and the sample may be branched and introduced into each of the channels from the main injection part.

The device containing microbeads for adjusting pH of a sample according to the present invention may further comprise a main passage part which connects the main injection part and each of the inlets and has an aliquot structure, and the sample injected into the main injection part may be distributed to each of the channels through the main passage part.

The device containing microbeads for adjusting pH of a sample according to the present invention may further comprise a frit between the region filled with the microbeads in the channel and the outlet, the sample passed through the microbeads may pass through the frit to be discharged to the outlet, and the microbeads may be prevented from exiting the outlet.

In the device containing microbeads for adjusting pH of a sample according to the present invention, the channel may be provided in plurality, and each of the channels may be provided with the inlet and the outlet, respectively.

The device containing microbeads for adjusting pH of a sample according to the present invention may further comprise an injection member connected with the main injection part, the injection member may further comprise a piston, one end of the injection member may be connected with the main injection part and the other end of the injection member may be provided with the piston, and the sample may be injected into the injection member by pushing the piston, thereby moving the injected sample to each of the channels.

In the device containing microbeads for adjusting pH of a sample according to the present invention, the sample to be injected into the inlet may be neutral.

The device containing microbeads for adjusting pH of a sample according to the present invention may further comprise a main injection part for receiving the sample and injecting the sample into the inlet, the inlet, wherein the inlet, the channel and the outlet may be provided in plurality respectively and paired with each other, and each of the plurality of pairs of the inlet, the channel and the outlet may be radially disposed on a rotating disk.

The device containing microbeads for adjusting pH of a sample according to the present invention may further comprise a main passage part connected with the main injection part; and aliquot passage parts extending radially from the main passage part to each of the inlets, wherein the main injection part may comprise an opening through which the sample is injected and a sample reservoir for storing the sample before the injected sample is distributed to each of the aliquot passage parts.

In the device containing microbeads for adjusting pH of a sample according to the present invention, the sample reservoir and the main passage part are coupled in a spiral shape.

In the device containing microbeads for adjusting pH of a sample according to the present invention, the main passage part may be bent so that one end of the main passage part extends in a direction away from the rotating shaft of the rotating disk.

In the device containing microbeads for adjusting pH of a sample according to the present invention, a vent hole may be connected to a flow path between the main passage part and the channel.

Hereinafter, a device 1 containing microbeads for adjusting pH of a sample according to one embodiment of the present invention will be described in detail. The accompanying drawings, which are included to provide a further understanding of the invention, illustrate embodiments of the invention and are not intended to limit the technical scope of the present invention.

In addition, the same or corresponding components will be denoted by the same reference numerals regardless of symbols, and redundant description thereof will be omitted. For convenience of explanation, the size and shape of each component shown may be exaggerated or reduced.

Figure 1:
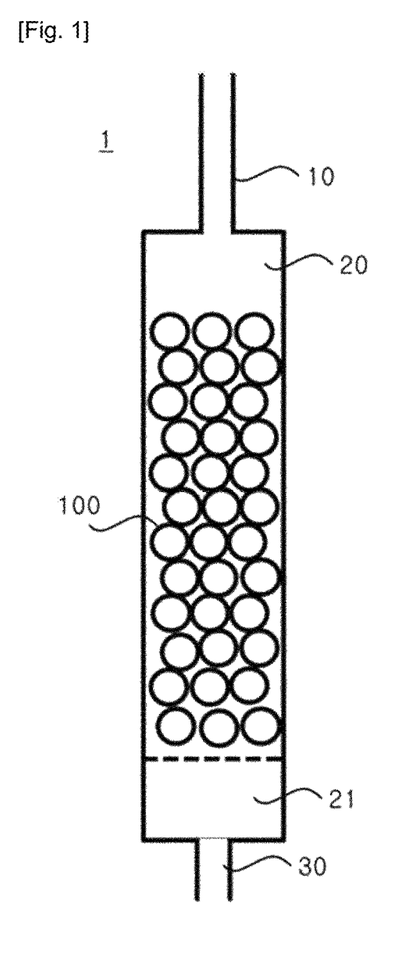
FIG. 1 is a schematic diagram of a device containing microbeads capable of adjusting pH of a sample according to an embodiment of the present invention.

FIG. 1 is a schematic diagram of a device 1 containing microbeads capable of adjusting pH of a sample according to an embodiment of the present invention. The device 1 containing microbeads for adjusting pH of a sample according to an embodiment of the present invention may comprise an inlet 10 for injecting the sample into the channel; a channel 20 for adjusting pH of the injected sample; an outlet 30 for discharging the sample having its pH adjusted. The sample to be injected into the inlet 10 may be, for example, an aqueous solution.

The channel 20 contains a plurality of microbeads 100 to adjust the pH of the injected sample. The surface of the microbeads 100 is coated with a salt so that the injected sample can be adjusted to have a desired pH between pH 0 and 14 while passing through the channel 20. Alternatively, the surface of the microbeads 100 is coated with a salt so that the injected sample can be adjusted to have any one desired pH among pH 1, pH 2, pH 3, pH 4, pH 5, pH 6, pH 7, pH 8, pH 9, pH 10, pH 11, pH 12 and pH 13, i.e., the pH of the microbeads 100 while passing through the channel 20.

The microbeads 100 are incubated in a buffer solution to adjust to have a desired pH, followed by volatilization of a solvent component at 50° C. and in $N_2$ atmosphere to obtain microbeads with a respective desired pH. The buffer, for example, may be prepared including the reagent in Table 1. More specifically, a buffer solution having a desired pH may be prepared by adjusting a ratio of conjugate base and acid according to the following Henderson-Hasselbach equation.

$$-\log[H_3O^+] = -\log K_a - \log\frac{[HA]}{[A^-]}$$

$$pH = pK_a - \log\frac{[HA]}{[A^-]}$$

$$pH = pK_a + \log\frac{[A^-]}{[HA]}$$

wherein, $K_a$ is an acid dissociation constant, [HA] is a concentration of an acid, [A−] is a concentration of a conjugate base, and [H+] is a concentration of hydrogen ion.

In other words, the buffer solution having more than pH 0 and less than pH 14 or from pH 1 to pH 13 may be prepared by a reagent combination of weak acid/strong acid, acid/base, acid/conjugate base, weak base/strong base or salt/base. In general, an acid/base reagent combination and a corresponding composition ratio thereof may be used to prepare buffers with varying pH values. However, a weak acid/strong acid reagent combination may be used primarily to prepare acidic buffer solutions of pH 2 to pH 4, and a weak base/strong base reagent combination may be used primarily to prepare basic buffer solutions of pH 9 to pH 11, for example.

In addition, the microbeads 100 are silica-based materials and all components of the substance in the pH buffer may be adsorbed to the microbeads 100. At this time, the pH of the microbeads is determined according to the composition ratio of all components of the substance except for the solvent component in each pH buffer (for example, the composition ratio of the substance of Table 1 below). When the neutral sample passes through the microbeads 100 prepared as described above, salts adsorbed on the microbeads 100 are eluted to change the pH of the sample, thereby controlling the sample having a desired pH.

Each of the plurality of channels 20 may be filled with microbeads 100 coated with a butter solution prepared using different reagent combinations of weak acid/strong acid, acid/base, acid/conjugate base, weak base/strong base and salt/base, and corresponding composition ratios.

TABLE 1

Examples of reagents for preparing a pH buffer
Hydrochloric acid/Potassium chloride
Glycine/Hydrochloric acid
Potassium hydrogen phthalate/Hydrochloric acid
Citric acid/Sodium citrate
Sodium acetate/Acetic acid
Potassium hydrogen phthalate/Sodium hydroxide
Disodium hydrogen phthalate/Sodium dihydrogen orthophosphate
Dipotassium hydrogen phthalate/Potassium dihydrogen orthophosphate
Potassium dihydrogen orthophosphate/Sodium hydroxide
Barbitone sodium/Hydrochloric acid TABLE 1-continued Tris (hydroxylmethyl) aminomethane/Hydrochloric acid
Sodium tetraborate/Hydrochloric acid
Glycine/Sodium hydroxide
Sodium carbonate/Sodium hydrogen carbonate
Sodium tetraborate/Sodium hydroxide
Sodium bicarbonate/Sodium hydroxide
Sodium hydrogen orthophosphate/Sodium hydroxide
Potassium chloride/Sodium hydroxide In Table 1, in the case of potassium hydrogen phthalate/hydrochloric acid, potassium hydrogen phthalate is used as a weak acid and hydrochloric acid is used as a strong acid. The concentrations of hydrogen ion and conjugate base from potassium hydrogen phthalate are determined by the amount of a strong acid hydrochloric acid to be added, thereby adjusting the pH. In the manufacturing process as described above, the microbeads 100 are sufficiently coated with salts on the surface, but the microbeads may be made of silica-based material having Si—OH groups such that the salts coated on the microbeads 100 may be sufficiently eluted into the sample when the sample passes through the channel 20. In addition, the microbeads 100 may be any one as long as all components of the material in the pH buffer can be sufficiently adsorbed, but may have a smooth surface or a porous structure. In the case of a porous structure, the large surface area facilitates the pH control of a large volume of the sample. In addition, the diameter of the microbeads 100 may be 150 µm to 210 µm, for example. In addition, the microbeads 100 may be filled in the channel 20 in an amount of, for example, several ten mg to several hundred mg, and a sample to be injected into the inlet 10 may be used in an amount of several ml.

In addition, the shape of the channel 20 may be a hollow shape, for example, a cylindrical shape as described in the present invention, but is not limited thereto. As long as the channel is located between the inlet 10 and the outlet 30 and filled with microbeads 100, various modifications and changes are possible according to the environment in which the present invention is implemented.

On the other hand, when the channel 20 has a cylindrical shape, the channel 20 may have a height of 7.5 cm and a diameter of 1 cm, for example. Likewise, the size and volume of the channel 20 is not limited thereto, and various modifications and changes are possible according to the environment in which the present invention is implemented.

The sample to be injected into the device 1 containing microbeads capable of adjusting pH of the sample may be neutral, for example, have a pH value of 6.8 to 7.9.

A frit may be further provided between the region filled with microbeads 100 in the channel 20 and the outlet 300. Therefore, the sample passed through the microbeads 100 can be discharged to the outlet 30, but the microbeads 100 can be prevented from exiting the outlet 30. The frit 21 may be, for example, glass wool.

The sample injected into the inlet 100 may pass through the microbeads 100 filled in the channel 20, pass through the frit 21, and be discharged to the outlet 30. The sample discharged to the outlet 30 may be adjusted to have a desired pH, and preferably may have the same pH as the pH of the microbeads 100.

Figure 2:
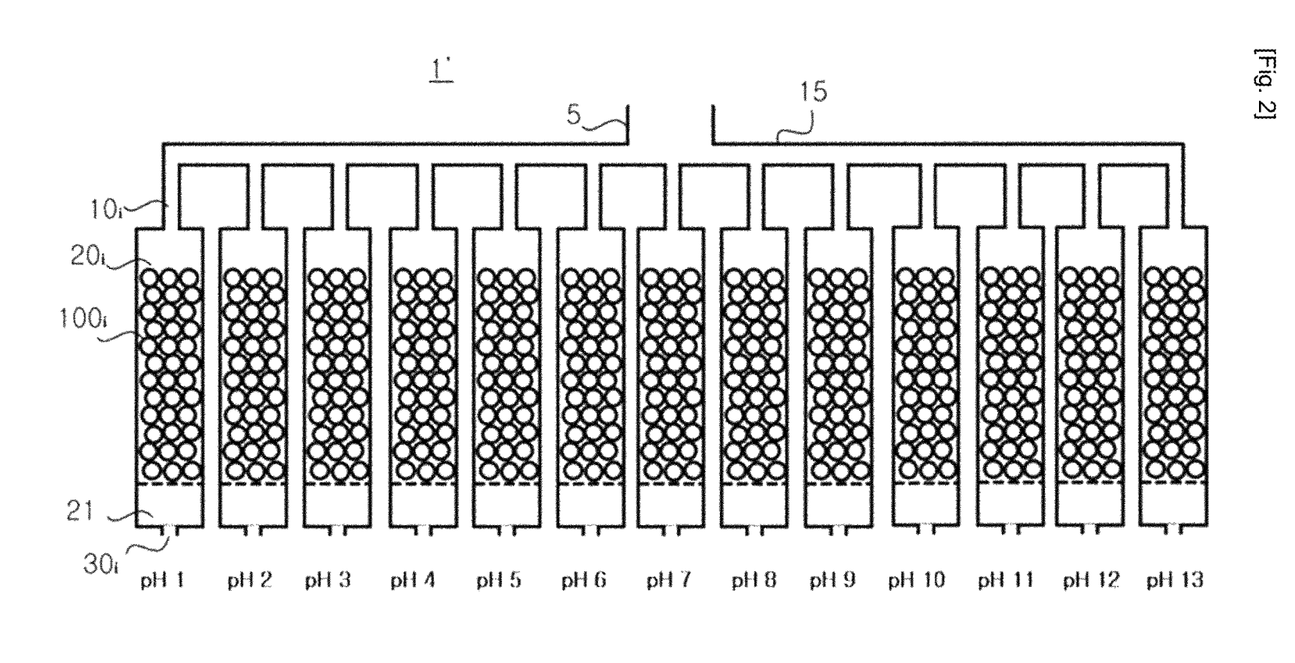
FIG. 2 is a schematic diagram of a device containing microbeads capable of multiple pH adjustment of a sample, with some modifications of the device of FIG. 1.

FIG. 2 is a schematic diagram of a device 1' containing microbeads capable of multiple pH adjustment of a sample, with some modifications of the device of FIG. 1. The device 1' containing microbeads capable of multiple pH adjustment of the sample comprises a plurality of channels $20_i$. Here, i is a natural number from 1 to n. Each of the plurality of channels $20_i$ may have microbeads $100_i$ having different pHs from each other. The number of the plurality of channels $20_i$ may be, for example, two, four, six, eight, ten or twelve.

In addition, the device 1' containing microbeads capable of adjusting multiple pH adjustment of the sample comprises a plurality of inlets $10_i$ through which the sample is injected and each of which is connected with each of the plurality of channels $20_i$, and a plurality of outlets $30_i$ through which the sample having pH adjusted in each of the plurality of the channels is discharged. More specifically, each of the channels $20_i$ is connected with each of the inlets $10_i$ and each of the outlets $30_i$. The inlet $10_i$ of each of the channels $20_i$ is connected with the main passage part 15 and the main injection part 5. The main passage part 15 has an aliquot structure. Accordingly, the sample injected into one main injection part 5 is injected into the inlet $10_i$ of each of the channels $20_i$ via the main passage part 15 to pass through microbeads $100_i$ filled in each of the channels $20_i$, thereby discharging to each of the outlets $30_i$.

In addition, each of the inlets $10_i$ may further include an on/off valve (not shown). Accordingly, it is possible to control the on/off valve, so that the sample can pass through only the channel that can be adjusted to a desired pH among the plurality of channels.

In FIG. 2, the plurality of channels $20_i$ are configured such that the sample injected into the main injection part 5 can be discharged as having, for example, pH 1, pH 2, pH 3, pH 4, pH 5, pH 6, pH 7, pH 8, pH 9, pH 10, pH 11, pH 12 and pH 13. The microbeads $100_i$ filled in each of the plurality of channels $20_i$ may have a value of pH 1, pH 2, pH 3, pH 4, pH 5, pH 6, pH 7, pH 8, pH 9, pH 10, pH 11, pH 12 and pH 13, respectively, and may be prepared with the buffer of the above-mentioned Table 1.

In the case of the device 1' containing microbeads capable of multiple pH adjustment of the sample as shown in FIG. 2, samples injected into one main injection part 5 may be adjusted to have a respective desired pH through each of the plurality of channels $20_i$ and then discharged. Accordingly, there is an advantage of adjusting the pH of the sample more efficiently and in multiple.

Figure 3:
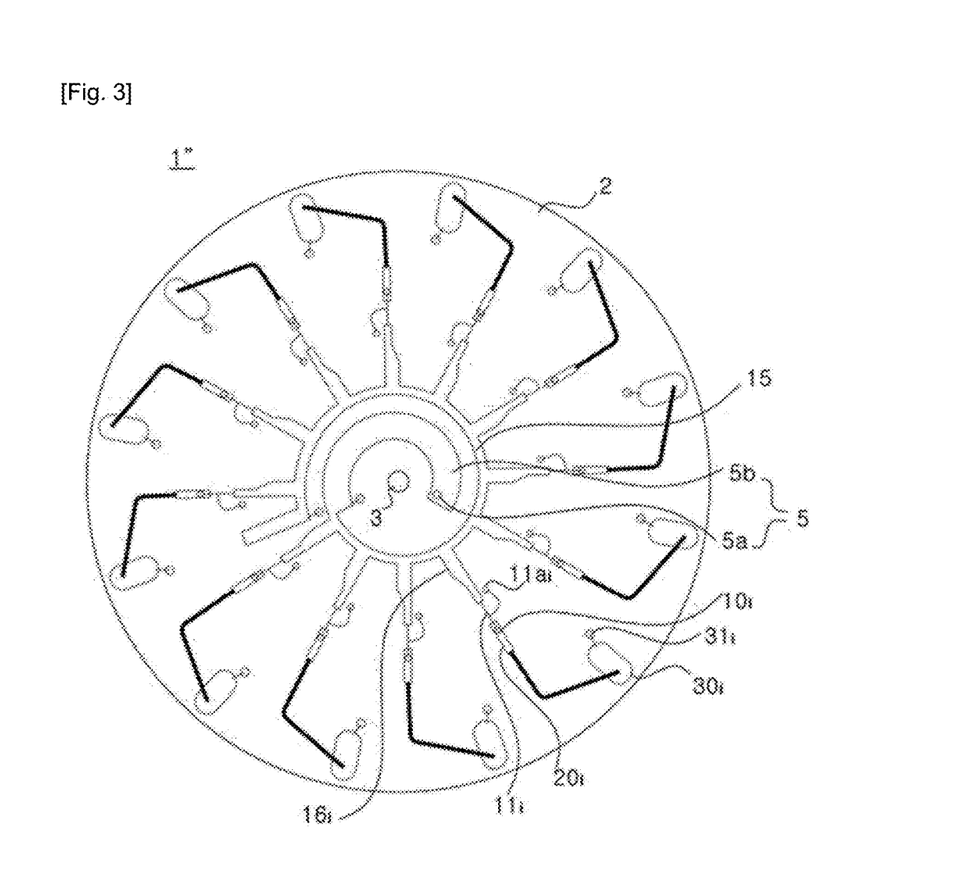
FIG. 3 is a schematic diagram of a device containing microbeads capable of multiple pH adjustment of a sample, which is one embodiment of the device of FIG. 2.

FIG. 3 is a schematic diagram of a device 1" containing microbeads capable of multiple pH adjustment of a sample, which is one embodiment of the device of FIG. 2.

The device 1" containing microbeads capable of multiple pH adjustment of a sample according to FIG. 3 has a shape of rotating disk. On the rotating disk 2 having the rotating shaft 3, a plurality of channels $20_i$ as described above in FIG. 2 are arranged radially. Here, i is a natural number from 1 to n. More specifically, it comprises a plurality of inlets $10_i$ which are connected with each of the plurality of channels $20_i$, and a plurality of outlets $30_i$ through which the sample having pH adjusted in each of the plurality of the channels is discharged. Each of pairs of the plurality of channels, the plurality of inlets and the plurality of outlets is disposed radially on the rotating disk.

The microbeads $100_i$ filled in each of the plurality of channels $20_i$ may have a value of pH 1, pH 2, pH 3, pH 4, pH 5, pH 6, pH 7, pH 8, pH 9, pH 10, pH 11, pH 12 and pH 13, respectively, and may be prepared with the buffer of the above-mentioned Table 1. Here, i is a natural number from 1 to n.

The main injection part 5 is disposed around the rotating shaft 3, and the main injection part 5, the main passage part 15, the inlets 10i, the channels 20i and the outlets 30i are arranged in this order in a direction from the rotating axis 3 of the rotating disk 2 to the edge. The main injection part 5 comprises an opening 5a through which the sample is injected. It also comprises a sample reservoir 5b for storing the sample before the injected sample is distributed into each of the channels $20_i$. The sample reservoir 5b may have a shape surrounding the rotating shaft 3. The end of the sample reservoir 5b is connected with the main passage part 15. The main passage part 15 may also have a shape surrounding the rotating shaft 3. The shape in which the sample reservoir 5b and the main passage part 15 are coupled may be a spiral shape.

The main passage part 15 may be bent so that one end of the main passage part extends in a direction away from the rotating shaft of the rotating disk.

The main passage part 15 is connected with a plurality of aliquot passage parts $16_i$. Each of the aliquot passage parts $16_i$ extends radially from the main passage part 15 to each of the channels $20_i$. Sample in the main passage part 15 is distributed by the volume of each of the aliquot passage parts $16_i$. Accordingly, the sample injected into one main injection part 5 passes through the main passage part 15 and is distributed to each of the aliquot passage parts $16_i$. The sample distributed in the aliquot passage parts $16_i$ is injected into the each of the inlets $10_i$ of each of the channels $20_i$ and passes through the microbeads $100i$ (see FIG. 2) filled in each of the channels $20_i$ to move to each of the outlets $30_i$. The inlets $10_i$ may further comprise on/off valves $111_i$ and the on/off valves $11_i$ may be, for example, capillary valves and may further comprise vent holes $11_{ai}$. That is, the vent holes may be connected with the flow path between the main passage part 15 and the channel 20. As will be described later, for example, the sample passes through the capillary valves when applied a rotational force of 3000 RPM. The outlets $30_i$ may have a structure capable of receiving a sample having pH adjusted after passing through the channels $20_i$. In such a case, the pH-adjusted sample may be recovered later by a micro pipette via vent holes $31i$, if necessary. The outlets $30_i$ may further comprise vent holes $31_i$. By providing the vent holes $31i$, the air filled in the channels $20_i$ is drawn out so that the fluid can move to the outlets $30_i$ by the rotational force.

Regarding the operation of the device 1" containing microbeads capable of multiple pH adjustment of a sample, for example, the sample is injected into the main injection part 5, and by rotating the rotating disk at 1000 RPM for 20 seconds the sample in the main injection part 5 passes through the main passage part 15 to the aliquot passage parts $16i$ to be distributed. Then, by rotating the rotating disk at 3000 RPM for 20 seconds, the sample distributed in the aliquot passage parts $16i$ is moved to each of the channels $20i$, and passes through the microbeads filled in each of the channels $20i$ to be adjusted to have a desired pH and moves to outlets $30i$.

In another embodiment, the device containing microbeads capable of multiple pH adjustment of a sample may further comprise an injection member (not shown) in the main injection part 5 so that a sample injected into one main injection part 5 can be more easily injected into each of the plurality of channels $20_i$ at the same time. In addition, the injection member may further comprise a piston (not shown), and may further comprise a volume controller (not shown). One end of the injection member may be connected with the main injection part 5 and the other end may be provided with a piston. The operation may carried out, for example, by removing the piston, injecting the sample into the injection member, and then mounting the piston inside the injection member and pushing the piston to move the sample toward the channel $20_i$. The volume controller may, for example, be in the form of a multichannel pipette. It may be operated by operating a pipette set to a predetermined volume to fill the same volume of sample in each of the channels connected with the pipette.

Experimental Example

Table 2 shows the pH change of the sample after passing the sample of pH 7.7 through the channel 20 filled with the microbeads 100. The amount of sample injected is 2 ml, and the amount of microbeads 100 filled in the channel 20 is 100 mg. The pH values in Table 2 are the results measured with S220 SevenCompact™ pH/Ion (METTLER TOLEDO).

TABLE 2

| | | Manufacturing temperature of beads | | | | | | | |
|---|---|---|---|---|---|---|---|---|---|
| | | R.T | | 50° C. | | 70° C. | | 90° C. | |
| pH of beads | pH of sample before passing through beads | pH of sample after passing through beads | Deviation | pH of sample after passing through beads | Deviation | pH of sample after passing through beads | Deviation | pH of sample after passing through beads | Deviation |
| 1 | 7.7 | 3.7 | −2.7 | 2.5 | −1.5 | 7.1 | −6.1 | 8.2 | −7.2 |
| 2 | 7.7 | 1.1 | 0.9 | 2.6 | −0.6 | 2.0 | 0.0 | 2.9 | −0.9 |
| 3 | 7.7 | 2.1 | 0.9 | 3.5 | −0.5 | 2.7 | 0.3 | 3.0 | 0.0 |
| 4 | 7.7 | 3.8 | 0.2 | 4.7 | −0.7 | 5.0 | −1.0 | 3.1 | 0.9 |
| 5 | 7.7 | 6.8 | −1.8 | 5.5 | −0.5 | 5.5 | −0.5 | 6.9 | −1.9 |
| 6 | 7.7 | 6.0 | 0.0 | 5.9 | 0.1 | 6.0 | 0.0 | 6.0 | 0.0 |
| 7 | 7.7 | 7.1 | −0.1 | 7.0 | 0.0 | 6.9 | 0.1 | 7.1 | −0.1 |
| 8 | 7.7 | 8.2 | −0.2 | 7.9 | 0.1 | 8.1 | −0.1 | 8.2 | −0.2 |
| 9 | 7.7 | 8.0 | 1.0 | 8.9 | 0.1 | 8.9 | 0.1 | 9.0 | 0.0 |
| 10 | 7.7 | 8.9 | 1.1 | 9.9 | 0.1 | 8.3 | 1.7 | 9.4 | 0.6 |
| 11 | 7.7 | 9.7 | 1.3 | 10.7 | 0.3 | — | | — | |
| 12 | 7.7 | 10.8 | 1.2 | 10.8 | 1.2 | 11.3 | 0.7 | 11.4 | 0.6 |
| 13 | 7.7 | 11.7 | 1.3 | 11.7 | 1.3 | 11.4 | 1.6 | 12.4 | 0.6 |

Figure 4:
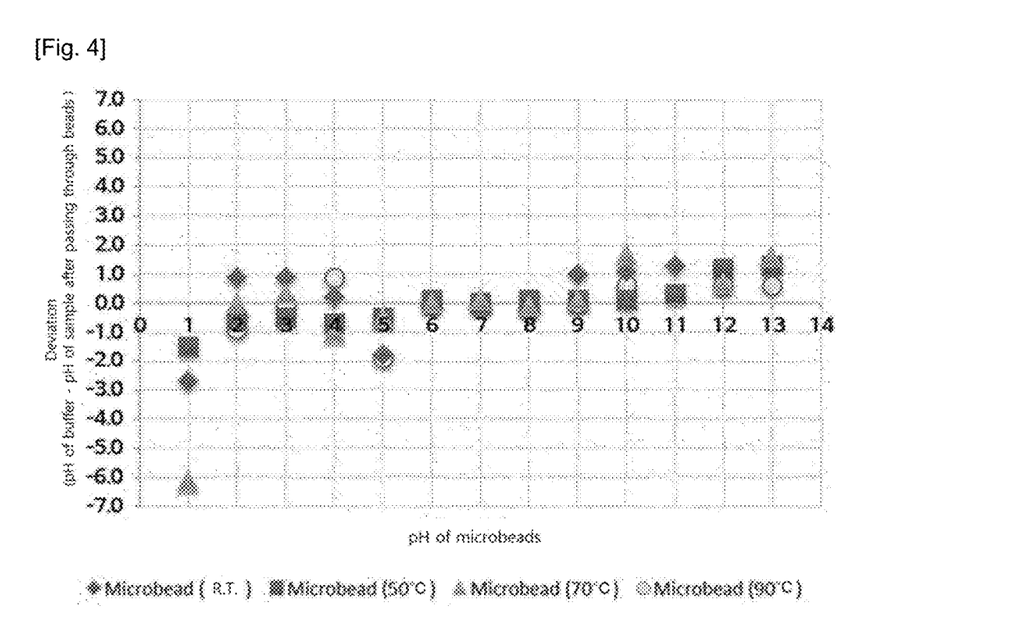
FIG. 4 is a graph showing the experimental results of the pH change of the sample in the experimental example of the present invention.

FIG. 4 is a graph showing results in Table 2. According to the results of experiment of microbeads 100 depending on manufacturing temperature, it can be seen that when the microbeads 100 were manufactured at 50° C., pH deviation between pH of the sample after passing the microbeads 100 and pH of the microbeads 100 was the smallest. As the pH of the microbeads 100 increases, conditions under which the correlation of the pH of the sample after passing through the microbeads 100 are constant may be set as optimum conditions. Referring to the experimental results of Table 2, the optimum temperature condition of production of the microbeads 100 is 50° C. In the case of pH 1 and pH 13, reagents are volatilized during manufacturing the microbeads 100, causing pH deviation.

It will be appreciated that the technical configuration of the present invention described above may be embodied in other specific forms by those skilled in the art without changing the technical spirit or essential features of the present invention. Therefore, it is to be understood that the embodiments described above are exemplary in all respects and not restrictive. In addition, the scope of the present invention is indicated by the appended claims to be described later rather than the detailed description above. In addition, it should be construed that all changes or modifications derived from the meaning and scope of the claims and equivalent concepts thereof are included in the scope of the present invention.

INDUSTRIAL AVAILABILITY

According to the present invention, it is possible to adjust a sample to have a desired pH more simply and quickly by including microbeads for adjusting pH in the channel. In addition, provided with a plurality of channels, each of which has microbeads capable of adjusting to each of the plurality of pH values, there is an advantage that can simultaneously adjust to multiple desired pHs with a single sample injection.

In addition, the disk-type device comprising microbeads capable of adjusting the pH of the sample of the present invention is manufactured in the shape of rotating disk and enables the sample to pass through the beads-filled channels having different pH by control of the rotational force on the rotating disk. These features can be integrated into sensing analysis systems through disk-based chemical reactions to improve detection sensitivity.

What is claimed is:

1. A device containing microbeads capable of adjusting pH of a sample, comprising:
   a channel filled with microbeads;
   an inlet for injecting the sample into the channel; and
   an outlet for discharging the sample having its pH adjusted in the channel,
   wherein the pH of the injected sample is adjusted to the pH of the microbeads in the channel, and
   wherein the surface of the microbeads is coated with salt so that the pH of the injected sample can be adjusted to a desired pH in the channel.

2. The device according to claim 1, further comprising a main injection part for receiving the sample and injecting the sample into the inlet,
   wherein the channel is provided in plurality, and each of the channels is provided with the inlet and the outlet,
   wherein the microbeads filled in each of the channels are coated to have different pH, and
   wherein the sample is branched and introduced into each of the channels from the main injection part.

3. The device according to claim 2, further comprising a main passage part which connects the main injection part and each of the inlets and has an aliquot structure,
   wherein the sample injected into the main injection part is distributed to each of the channels through the main passage part.

4. The device according to claim 1, further comprising a frit between a region filled with the microbeads in the channel and the outlet,
   wherein the sample passed through the microbeads passes through the frit to be discharged to the outlet, and the microbeads are prevented from exiting the outlet.

5. The device according to claim 1, wherein the channel is provided in plurality, and each of the channels is provided with the inlet and the outlet.

6. The device according to claim 5, further comprising a main injection part for receiving the sample and injecting the sample into the inlet, and an injection member connected with the main injection part,
   wherein the injection member further comprises a piston,
   wherein one end of the injection member is connected with the main injection part and the other end of the injection member is provided with the piston, and
   wherein the sample is injected into the injection member by pushing the piston, thereby moving the injected sample to each of the channels.

7. The device according to claim 1, wherein the sample to be injected into the inlet is neutral.

8. The device according to claim 1, further comprising a main injection part for receiving the sample and injecting the sample into the inlet, wherein
   the inlet, the channel and the outlet are provided in plurality respectively and paired with each other, and
   each of the plurality of pairs of the inlet, the channel and the outlet is radially disposed on a rotating disk.

9. The device according to claim 8, further comprising a main passage part connected with the main injection part; and aliquot passage parts extending radially from the main passage part to each of the inlets,
   wherein the main injection part comprises an opening through which the sample is injected and a sample reservoir for storing the sample before the injected sample is distributed to each of the aliquot passage parts.

10. The device according to claim 9, wherein the sample reservoir and the main passage part are coupled in a spiral shape.

11. The device according to claim 10, wherein the rotating disk has a rotating shaft, and
   wherein the main passage part is bent so that one end of the main passage part extends in a direction away from the rotating shaft of the rotating disk.

12. The device according to claim 9, wherein a vent hole is connected to a flow path between the main passage part and the channel.

* * * * *